United States Patent [19]

Harris

[11] 4,313,834

[45] Feb. 2, 1982

[54] HIGH VISCOSITY ACIDIC TREATING FLUIDS AND METHODS OF FORMING AND USING THE SAME

[75] Inventor: Lawrence E. Harris, Duncan, Okla.

[73] Assignee: Halliburton Company, Duncan, Okla.

[21] Appl. No.: 89,080

[22] Filed: Oct. 29, 1979

Related U.S. Application Data

[62] Division of Ser. No. 947,327, Oct. 2, 1978.

[51] Int. Cl.$^3$ .............................................. E21B 43/27
[52] U.S. Cl. ............................... 252/8.55 C; 166/307; 252/316
[58] Field of Search ..................... 252/8.55 R, 8.55 C, 252/8.5 C, 316; 166/282, 307

[56] References Cited

U.S. PATENT DOCUMENTS

| | | | |
|---|---|---|---|
| 3,301,723 | 1/1967 | Chrisp | 252/316 |
| 3,727,688 | 4/1973 | Clampitt | 252/8.55 X |
| 3,888,312 | 6/1975 | Tiner et al. | 166/308 |
| 4,021,355 | 5/1977 | Holtmyer et al. | 252/8.55 |
| 4,068,714 | 1/1978 | Hessert et al. | 252/8.55 X |
| 4,068,719 | 1/1978 | Clampitt et al. | 252/8.55 X |
| 4,068,720 | 1/1978 | Hessert et al. | 252/8.55 X |
| 4,110,230 | 8/1978 | Hessert et al. | 252/8.55 |

Primary Examiner—Herbert B. Guynn
Attorney, Agent, or Firm—Edward F. Sherer; John H. Tregoning; Thomas R. Weaver

[57] ABSTRACT

High viscosity acidic treating fluids comprised of aqueous acid solutions containing zirconium cross-linked hydrophilic organic polymers are provided having improved viscosity and temperature stability properties. Methods of forming such acidic treating fluids and treating subterranean well formations therewith are also provided.

14 Claims, No Drawings

HIGH VISCOSITY ACIDIC TREATING FLUIDS AND METHODS OF FORMING AND USING THE SAME

This is a division, of application Ser. No. 947,327, filed Oct. 2, 1978.

Acidizing and fracture acidizing procedures using acidic treating fluids are commonly carried out in subterranean well formations to accomplish a number of purposes, one of which is to increase the recovery of hydrocarbons therefrom. In acidizing procedures, acidic treating fluids are introduced into well formations under pressure so that the treating fluids flow into the pore spaces of the formations and react with materials contained therein whereby the pore spaces are enlarged and the permeability of the formations is increased. In fracture acidizing procedures, one or more fractures are produced in the formations and the acidic treating fluids are introduced into the fractures to etch flow channels therein and/or to enlarge the pore spaces in the fracture faces and in the formation.

Increasing the viscosity of an aqueous acid solution by the inclusion of certain hydrophilic materials therein, hereinafter referred to as "gelling agents", has been accomplished heretofore. In acidizing and/or fracture acidizing subterranean formations, high viscosity aqueous acid solutions are useful in preventing the acid from becoming prematurely spent and inactive. In addition, the high viscosity of the acid solutions enables the development of wider fractures so that live acid can be forced further into the formations, increases the proppant carrying capacity of the acid solutions and permits better fluid loss control.

In addition to acidizing and fracture acidizing treatments, high viscosity acidic treating fluids are useful in carrying out subterranean well completions, for transporting sand in sand and gravel packing procedures and in various other well treating procedures. Also, high viscosity acidic treating fluids have utility in cleaning applications such as in the cleaning of tubular goods, production equipment and industrial equipment. Equipment typically cleaned includes oil well piping, tubing, tanks and process equipment; boilers; heat exchangers; conventional and nuclear power plants and accessory equipment and the like.

Gelling agents such as hydratable carboxyl substituted polysaccharides, hydratable partially hydrolized polyacrylamides and hydratable xanthan polymers have been utilized heretofore to increase the viscosity of aqueous acid solutions. However, the gels produced with such gelling agents generally have limited stability and/or viscosity at high temperatures in the presence of acid, i.e., the viscosity of the gelled aqueous acid solutions decreases after only a short period of time. Chemicals which crosslink or complex hydrated gelling agents have also been utilized heretofore for further increasing the viscosity of gelled aqueous solutions. For example, U.S. Pat. Nos. 3,888,312, 4,021,355 and 4,033,415, all assigned to the assignee of this present invention and incorporated herein by reference, describe and claim organotitante, permanganate salts and antimony crosslinking agents respectively. U.S. Pat. No. 3,959,003 teaches the use of a water soluble cellulose complexed with a polyvalent metal salt as a thixotropic agent for cementing compositions. U.S. Pat. No. 3,979,303 teaches an oil well drilling fluid containing complexed polysaccharides.

By the present invention, acidic treating fluids are provided which have improved viscosity and/or temperature stability properties. Methods of forming such acidic treating fluids and treating subterranean formations therewith are also provided.

The acidic treating fluids of this invention are formed by combining a hydratable gelling agent capable of being crosslinked with metal ions and a zirconium crosslinking agent with an aqueous acid solution. When hydrated, the gelling agent increases the viscosity of the acid solution. The zirconium crosslinking agent crosslinks the hydrated gelling agent thereby further increasing the viscosity and providing stability to the resulting viscous fluid at temperatures as high as 180° F.

The crosslinked gels of this invention are more stable at higher temperatures or have higher viscosity than prior crosslinked gels. For example, a typical gel of this invention is stable in the presence of hydrochloric acid up to about 180° F., and the same gel may be stable up to about 200° F. in formic acid, and up to about 220° F. in acetic acid. Likewise, the stability can be higher for a mixture of acids having a high total acid concentration. Stability means that although the gel begins breaking when mixed with the acid, the gel-acid composition has a useful life under given conditions of temperature and acid concentration, such as from about several minutes up to about an hour depending on the particular acid or acids, the particular gel or polymers used, concentration and temperature, as well as any special contaminants or conditions of use.

Hydratable gelling agents which are suitable for use in accordance with the present invention are those hydrophilic organic polymers having a molecular weight of greater than 100,000 and containing some carboxyl functionality whereby they can be cross-linked with metal ions, such as water soluble synthetic polymers including homopolymers, copolymers and those polymers containing one or more repeating polymeric units and substituted polysaccharides. Examples of such polymers are substituted cellulose, substituted natural gums, acrylamides, methacrylamides, acrylates, methacrylates, maleic anhydrides, alkylvinyl ethers, vinyl alcohols and xanthan polymers. Polymers or copolymers of these units should contain functional groups. The polymer units or substitutents can include carboxyl groups, hydroxyl groups, and alkyl groups and combinations thereof having from one to about three carbon atoms which may be connected through other substituents such as oxygen and nitrogen.

Particularly preferred hydratable gelling agents are carboxymethylhydroxyethyl cellulose (CMHEC) having a degree of substitution (DS) in the range of from about 0.1 to 1.0 and a molar substitution (MS) in the range of about 0.5 to 5, carboxymethylhydroxypropyl guar (CMHPG) having a DS in the range of from about 0.05 to 0.5 and a MS in the range of from about 0.01 to 1.0, carboxyethylhydroxypropyl guar (CEHPG) having a DS in the range of from about 0.01 to 0.5 and a MS in the range of from about 0.01 to 1.0, polyacrylamides and polymethacrylamides which are hydrolized in the range of from about 1% to about 10% and xanthan polymer. The most preferred hydratable gelling agents are carboxymethylhydroxyethyl cellulose (CMHEC) having a DS of about 0.25 to 0.6 and a MS of about 1.0 to 3.0 and carboxymethylhydroxypropyl guar (CMHPG) having a DS of 0.05 to 0.2 and a MS of 0.1 to 0.5.

At higher DS values, the base gel may be sensitive to some multi-valent ions. At lower DS values the crosslinking may be harder to detect. In some cases other substituents or equivalents can be used and these should be considered within the appropriate ranges indicated herein.

When a hydrophilic organic polymer of the type described above or mixtures of such polymers are hydrated in an aqueous fluid and crosslinked by zirconium in the presence of acid, i.e., at a pH of below about 7, a highly viscous crosslinked gel is produced which has substantially improved temperature stability, i.e., increased viscosity over a longer period of time at high temperatures, as compared to heretofore used gelled aqueous acid solutions. A pH below about 3 is preferred in that at such pH the crosslinking reaction takes place rapidly.

The crosslinking agents useful in accordance with this invention are compounds containing zirconium and mixtures of such compounds which have at least some water or acid solubility. Preferred such compounds are zirconium salts such as zirconium oxychloride, zirconium hydroxychloride, zirconium acetate, zirconium hydroxide, zirconium carbonate, etc., or combinations thereof. Of these, zirconium oxychloride, zirconium hydroxychloride and zirconium acetate are preferred. Other crosslinking agents containing metals such as aluminum, chromium, titanium, boron, lead, zinc, tin and antimony do not function satisfactorily in aqueous highly acidic fluids. The crosslinking agents of this invention can be dissolved in aqueous or acidic solutions prior to use.

Various aqueous fluids can be utilized as the base fluid for forming the acidic treating fluids of the present invention including fresh water, sea water and brines. A variety of mineral acids, organic acids and mixtures of such acids can also be utilized. Examples of suitable mineral acids are hydrochloric acid, sulfuric acid and nitric acid. Examples of suitable organic acids are acetic acid and formic acid. The most preferred acids for use in accordance with the present invention are hydrochloric acid, acetic acid, formic acid and mixtures thereof.

The acidic treating fluids can include other commonly used additives such as proppants or other particulate material, e.g., sand, surfactants for bringing about desired properties to the fluids, corrosion inhibitors, extenders or retarders, fluid loss additives, diverting agents, breakers for decreasing the viscosity of the fluids after a desired period of time, etc. The treating fluid can also contain other fluid components such as $C_1$–$C_6$ alkyl alcohols, $C_1$–$C_6$ alkyl polyols, mutual solvents. The aqeuous liquid utilized herein is defined as a water-alcohol solution having 0 to 100, preferably 0 to 80, and still more preferably 0 to 40, percent alcohol by volume of solution. The preferred alcohols are alkanols having 1 to 5 carbon atoms. Examples of alcohols believed to be useful in the aqueous liquid include methanol, pentanol, furfuryl alcohol, ethylene glycol, and ethoxylated derivatives thereof. In addition, the acidic treating fluids can be utilized in carrying out acidizing treatments where gaseous or easily gasified components are added to the fluid such as carbon dioxide and/or nitrogen which are used to facilitate recovery of the fluids.

A preferred high viscosity acidic treating fluid of this invention is comprised of an aqueous fluid; a hydratable gelling agent selected from the group consisting of carboxymethylhydroxyethyl cellulose having a DS in the range of about 0.1 to 1.0 and a MS in the range of from about 0.5 to 5.0, carboxymethylhydroxypropyl guar having a DS in the range of about 0.05 to 0.5 and a MS in the range of about 0.01 to 1.0, carboxyethylhydroxypropyl guar having a DS in the range of about 0.01 to 0.5 and a MS in the range of from 0.1 to 1.0, polyacrylamide hydrolized in the range of from about 1% to about 10% and xanthan polymer, present in the aqueous fluid in an amount in the range of from about 10 to about 200 pounds of gelling agent per 1000 gallons of aqueous fluid; a zirconium salt crosslinking agent selected from the group consisting of zirconium oxychloride, zirconium hydroxychloride, zirconium acetate or mixtures thereof present in the acidic treating fluid in an amount in the range of from about 0.01 to about 15 pounds of zirconium salt per 1000 gallons of aqueous fluid; and an acid selected from the group consisting of hydrochloric acid, acetic acid, formic acid and mixtures thereof present in the acidic treating fluid in an amount in the range of from about 0.05 to about 30% by weight of the aqueous fluid.

The most preferred treating fluid of this invention is comprised of an aqueous fluid; a hydratable gelling agent selected from the group consisting of carboxymethylhydroxyethyl cellulose (CMHEC) having a DS of about 0.25 to 0.6 and a MS of about 1 to 3 and carboxymethylhydroxypropyl guar (CMHPG) having a DS of about 0.05 to 0.2 and a MS of about 0.05 to 0.2 present in the aqueous fluid in an amount in the range of from about 15 to 100 pounds per 1000 gallons of aqueous fluid; zirconium oxychloride crosslinker present in the treating fluid in an amount in the range of from about 0.01 to about 15 pounds of crosslinker per 1000 gallons of the aqueous fluid and hydrochloric acid or an acid mixture containing hydrochloric acid present in the treating fluid in an amount in the range of from about 0.2% to about 15% by weight of the aqueous fluid.

In one preferred method for forming the acidic treating fluids of this invention, the hydratable gelling agent utilized is combined with the base aqueous fluid used while agitating the mixture for a period of time sufficient for the gelling agent to hydrate. The zirconium crosslinking agent is then combined with the gelled aqueous fluid followed by combining the acid utilized with the fluid in an amount to lower the pH of the fluid to below about 3. As the acid is combined with the fluid, the zirconium crosslinker reacts with the gelling agent to crosslink the gelling agent and form the high viscosity acidic treating fluid of this invention which is stable at high temperatures. The crosslinking reaction occurs within about one minute at 70° F. and the viscosity of the treating fluid increases under static conditions until a maximum viscosity is attained in from about two to about five minutes. As mentioned above, the crosslinking reaction proceeds rapidly at a pH of below about 3 and is relatively stable in fluids having an acid concentration in the range of from about 0.2% to about 15% by weight of the aqueous fluid used. The stablity and viscosity of the treating fluids are best at HCl acid concentrations in the range of from about 0.2% to about 7% by weight of aqueous fluid used. For other acids or acid mixtures the optimum acid concentration can be higher or different. The order of combining the gelling agent, crosslinker and acid to the aqueous fluid is not critical. For example, the acid can be combined with the aqueous fluid first followed by the gelling agent and crosslinker, the gelling agent can be combined with the aqueous fluid followed by the acid and then the crosslinker, the crosslinker can be combined with the acid followed by the aqueous fluid and gelling agent, or the crosslinker can be combined with the aqueous fluid followed by acid then gelling agent. Various components can also be premixed with the last one or two remaining components being added. For example the acid and crosslinker can be premixed or the acid, water and crosslinker can be premixed. Likewise, there can be premixtures of water, gelling agent and acid; water and gelling agent; acid end gelling agent; water and crosslinker or acid and gelling agent.

Zirconium oxychloride, zirconium acetate and zirconium hydroxychloride are available in aqueous hydrochloric acid solutions containing the equivalent of approximately 20% $ZrO_2$. The zirconium oxychloride and zirconium acetate solutions are prepared at nominal acid to $ZrO_2$ molar rations of 2:1. The zirconium hydroxychloride solution is prepared at a nominal acid of $ZrO_2$ molar ration of 1:1. When such solutions are utilized in accordance with the present invention, they are combined with the other components of the treating fluid in an amount in the range of from about 0.1 to about 10 gallons of solution per 1000 gallons of the treating fluid.

As mentioned above, the treating fluids of this invention have increased viscosity as compared to prior treating fluids and exhibit increased temperature stability, bined with the treating fluids prior to use. Examples of such chemical breakers are ammonium persulfate, sodium persulfate, potassium persulfate, organic peroxides, other oxidizing type breakers and mixtures of breakers.

The following examples are given to further illustrate the present invention.

EXAMPLE 1

Various gelled aqueous fluids are prepared utilizing fresh water containing 2% potassium chloride and hydroxyethyl cellulose and carboxymethylhydroxyethyl cellulose gelling agents. Portions of an acidic aqueous zirconium oxychloride solution containing the equivalent of approximately 20% $ZrO_2$ are added to two portions of the aqueous fluids gelled with carboxymethylhydroxyethyl cellulose. Aqueous hydrochloric acid solution (37% by weight) is then added to all of the gelled fluids in amounts such that the fluids contain 3% hydrochloric acid by weight of fresh water utilized. The viscosities of the gelled and/or crosslinked fluids produced are tested for temperature stability by measuring the viscosities of the fluids at the temperatures and over the time periods given in Table I below. The viscosities given in Table I are apparent viscosities measured at 300 rpm on a FANN model 35 viscometer using No. 1 spring, standard bob and sleeve.

TABLE I

TEMPERATURE STABILITY OF GELLED AND CROSSLINKED AQUEOUS FLUIDS CONTAINING 3% HCl BY WEIGHT AT VARIOUS TEMPERATURES

| Gelling Agent Used | Quantity of Gelling Agent, Pounds Per 1000 Gallons of Aqueous 3% HCl | Quantity of Crosslinker Solution Used, Gallons Per 1000 Gallons of Aqueous 3% HCl | Temperature, °F. | Viscosity, cp | | | | | |
|---|---|---|---|---|---|---|---|---|---|
| | | | | 0 | 0.25HR | 0.5HR | 0.75HR | 1HR | 1.5HR |
| Hydroxyethyl Cellulose | 40 | 0 | 140 | 41 | 15 | 3 | — | — | — |
| Carboxymethylhydroxyethyl Cellulose | 40 | 0.8 | 140 | High[1] | High[1] | High[1] | 38 | 18 | 3 |
| Hydroxyethyl Cellulose | 40 | 0 | 120 | 42 | — | 13 | — | .5 | 4 |
| Carboxymethylhydroxyethyl Cellulose | 40 | 0.8 | 120 | High[1] | High[1] | High[1] | High[1] | High[1] | High[1] |
| Carboxymethylhydroxyethyl Cellulose | 40 | 0 | 124 | 30 | 22 | 17 | 13 | 10 | 4 |

| Gelling Agent Used | Quantity of Gelling Agent, Pounds Per 1000 Gallons of Aqueous 3% HCl | Quantity of Crosslinker Solution Used, Gallons Per 1000 Gallons of Aqueous 3% HCl | Temperature, °F. | Viscosity, cp | | | | |
|---|---|---|---|---|---|---|---|---|
| | | | | 2HR | 2.5HR | 3HR | 3.5HR | 4HR |
| Hydroxyethyl Cellulose | 40 | 0 | 140 | — | — | — | — | — |
| Carboxymethylhydroxyethyl Cellulose | 40 | 0.8 | 140 | — | — | — | — | — |
| Hydroxyethyl Cellulose | 40 | 0 | 120 | — | — | — | — | — |
| Carboxymethylhydroxyethyl Cellulose | 40 | 0.8 | 120 | — | 33 | 22 | 11 | 5 |
| Carboxymethylhydroxyethyl Cellulose | 40 | 0 | 124 | — | — | — | — | — |

[1]Fluid Complexed and Viscosity Not Measured Until the Complex Appearance of Fluid Disappeared.

i.e., the fluids remain highly viscous for significantly longer periods of time at temperatures in the range of from about 35° F. to about 180° F. If the acid contained in the treating fluids does not spend during use of the fluids, the fluids will "break" or revert to relatively thin fluids in a few hours. If the acid is spent, e.g., reacts with materials in subterranean formations being treated with the fluids, a chemical breaker of the type utilized heretofore for breaking gelled aqueous fluids can be com- From Table I it can be seen that the crosslinked treating fluids of the present invention have substantially increased stability at high temperatures (100°–140° F.) as compared to gelled aqueous fluids which are not crosslinked, and that when the acid contained in the treating fluids is not spent the fluids break within a few hours.

EXAMPLE 2

The procedure described in Example 1 is repeated except that the 37% by weight hydrochloric acid solution is combined with the gelled fluids in amounts to produce fluids containing 5% hydrochloric acid by weight of fresh water utilized. The results of these tests are shown in Table II below.

TABLE II

TEMPERATURE STABILITY OF GELLED AND CROSSLINKED AQUEOUS FLUIDS CONTAINING 5% HCl BY WEIGHT AT VARIOUS TEMPERATURES

| Gelling Agent Used | Quantity of Gelling Agent, Pounds Per 1000 Gallons of Aqueous 3% HCl | Quantity of Crosslinker Solution Used, Gallons Per 1000 Gallons of Aqueous 3% HCl | Temperature °F. | Viscosity, cp | | | | | | | | | |
|---|---|---|---|---|---|---|---|---|---|---|---|---|---|
| | | | | 0 | 0.25HR | 0.5 HR | 0.75 HR | 1HR | 1.5 HR | 2HR | 2.5 HR | 3HR | 3.5 HR | 4HR |
| Hydroxyethyl Cellulose | 40 | 0 | 140 | 42 | 17 | 3 | — | — | — | — | — | — | — | — |
| Carboxymethylhydroxyethyl Cellulose | 40 | 0.8 | 140 | High[1] | 35 | 5 | 3 | 2 | — | — | — | — | — | — |
| Hydroxyethyl Cellulose | 40 | 0 | 124 | 43 | 28 | 16 | 9 | 6 | 3 | — | — | — | — | — |
| Carboxymethylhydroxyethyl Cellulose | 40 | 0.8 | 124 | High[1] | High[1] | 30 | 15 | 6 | 4 | — | — | — | — | — |
| Carboxymethylhydroxyethyl Cellulose | 40 | 0 | 124 | 35 | 19 | 11 | 7 | 5 | 3 | — | — | — | — | — |
| Hydroxyethyl Cellulose | 40 | 0 | 100 | 42 | 38 | 32 | 29 | 26 | — | 18 | — | 11 | — | 7 |
| Carboxymethylhydroxyethyl Cellulose | 40 | 0.8 | 100 | High[1] | 62 | 52 | 46 | 40 | — | 30 | — | 14 | — | 7 |

[1]Fluid Complexed and Viscosity Not Measured Until the Complex Appearance of Fluid Disappeared.

From Table II it can be seen that the stability of the crosslinked treating fluids of the present invention is lower when the treating fluid contains 5% hydrochloric acid than when the treating fluids contain 3% hydrochloric acid (Table I). However, the crosslinked treating fluids have higher stability than gelled aqueous fluids containing the same concentrations of hydrochloric acid.

EXAMPLE 3

Various gelled aqueous fluids are prepared using fresh water containing 2% potassium chloride and various gelling agents. An acidic aqueous zirconium oxychloride solution containing the equivalent of approximately 20% ZrO₂ is added to one of the gelled aqueous fluids. Aqueous hydrochloric acid solution (37% by weight) is then added to the gelled aqueous fluids in amounts such that the fluids contain 3% hydrochloric acid by weight of fresh water. The viscosities of the resulting gelled and/or crosslinked aqueous fluids are determined. The results of these tests are given in Table III below.

TABLE III

VISCOSITY OF GELLED AND CROSSLINKED AQUEOUS FLUIDS CONTAINING 3% HCl BY WEIGHT

| Gelling Agent Used | Quantity of Gelling Agent, Pounds Per 1000 Gallons of 3% HCl | Quantity of Crosslinker Solution Used, Gallons Per 1000 Gallons of 3% HCl | Viscosity, cp[1] at 80° F. |
|---|---|---|---|
| Hydroxyethyl cellulose | 60 | 0 | 1360 |
| Guar | 60 | 0 | 1080 |
| Carboxymethylhydroxyethyl cellulose | 60 | 0 | 1020 |
| Carboxymethylhydroxyethyl cellulose | 60 | 1.2 | 18,500 |

[1]Measured on a Brookfield LVF viscometer with a No. 3 spindle at 6 rpm.

What is claimed is:

1. A method of forming a high viscosity acidic treating fluid which is stable at high temperatures comprising:

combining a hydratable gelling agent having a molecular weight greater than 100,000 and selected from the group consisting of carboxymethylhydroxyethyl cellulose having a DS in the range of about 0.1 to 1.0 and a MS in the range of about 0.5 to 5.0, carboxymethylhydroxypropyl guar having a DS in the range of about 0.05 to 0.5 and a MS in the range of about 0.01 to 1.0, carboxyethylhydroxypropyl guar having a DS in the range of from about 0.01 to 0.5 and a MS in the range of from about 0.01 to 1.0 and mixtures thereof with an aqueous fluid to form an aqueous gel;

combining an at least partially water or acid soluble zirconium salt with said aqueous gel; and combining at least one acid selected from the group consisting of hydrochloric acid, acetic acid, formic acid and mixtures thereof with said aqueous gel-zirconium salt mixture to lower the pH of said mixture to below about 3 thereby causing said aqueous gel to be rapidly cross-linked by said zirconium salt.

2. The method of claim 1 wherein said hydratable gelling agent is combined with said aqueous fluid in an amount in the range of from about 10 to about 200 pounds per 1000 gallons of aqueous fluid.

3. The method of claim 1 wherein said hydratable gelling agent is selected from the group consisting of carboxymethylhydroxyethyl cellulose having a DS of about 0.25 to 0.6 and a MS of about 1 to 3, carboxymethylhydroxypropyl guar having a DS of about 0.05 to 0.2 and a MS of about 0.1 to 0.5 and mixtures thereof and is combined with said aqueous fluid in an amount in the range of from about 15 to about 100 pounds per 1000 gallons of aqueous fluid.

4. The method of claim 2 wherein said zirconium salt is combined with said aqueous gel in an amount in the range of from about 0.01 to about 15 pounds per 1000 gallons of aqueous fluid.

5. The method of claim 4 wherein said zirconium salt is in the form of an aqueous acid solution containing the equivalent of approximately 20% $ZrO_2$ prepared at a nominal acid to $ZrO_2$ molar ratio of 2:1.

6. The method of claim 5 wherein said zirconium salt is zirconium oxychloride, and said zirconium oxychloride-aqueous acid solution is combined with said aqueous gel in an amount in the range of from about 0.1 to about 10 gallons per 1000 gallons of aqueous fluid used.

7. The method of claim 4 wherein said acid is combined with said aqueous gel-zirconium salt mixture in an amount in the range of from about 0.2% to about 30% by weight of aqueous fluid used.

8. The method of claim 6 wherein said acid is hydrochloric acid or an acid mixture containing hydrochloric acid and is combined with said aqueous gel-zirconium salt mixture in an amount in the range of from about 0.2% to about 15% by weight of aqueous fluid used.

9. A high viscosity acidic treating fluid which is stable at high temperatures comprising water, an acid selected from the group consisting of hydrochloric acid, acetic acid, formic acid and mixtures thereof, said acid being present in said well treating fluid in an amount sufficient to lower the pH thereof to below about 3, a hydrated gelling agent having a molecular weight greater than 100,000 and selected from the group consisting of carboxymethylhydroxyethyl cellulose having a DS in the range of about 0.1 to 1.0 and a MS in the range of about 0.5 to 5, carboxymethylhydroxypropyl guar having a DS in the range of about 0.05 to 0.5 and a MS in the range of about 0.01 to 1.0, carboxyethylhydroxypropyl guar having a DS in the range of from about 0.01 to 0.5 and a MS in the range of from about 0.01 to 1.0 and mixtures thereof, and at least one partially water or acid soluble zirconium salt.

10. The acidic treating fluid of claim 9 wherein said hydrated gelling agent is present in said well treating fluid in an amount in the range of from about 10 to about 200 pounds per 1000 gallons of water used.

11. The acidic treating fluid of claim 9 wherein said hydrated gelling agent is selected from the group consisting of carboxymethylhydroxyethyl cellulose having a DS of about 0.25 to 0.6 and a MS of about 1 to 3 and carboxymethylhydroxypropyl guar having a DS of about 0.5 to 0.2 and a MS of about 0.1 to 0.5 and is present in said acidic treating fluid in an amount in the range of from about 15 to about 100 pounds per 1000 gallons of water used.

12. The acidic treating fluid of claim 10 wherein said zirconium salt is present in said acidic treating fluid in an amount in the range of from about 0.01 to about 15 pounds per 1000 gallons of water used.

13. The acidic treating fluid of claim 12 wherein said acid is present in said acidic treating fluid in an amount in the range of from about 0.02% to about 30% by weight of said water used.

14. The acidic treating fluid of claim 12 wherein said acid is hydrochloric acid or an acid mixture containing hydrochloric acid and is present in said acidic treating fluid in an amount in the range of from about 0.2% to about 15% by weight of said water used.

* * * * *

UNITED STATES PATENT AND TRADEMARK OFFICE
CERTIFICATE OF CORRECTION

PATENT NO. : 4,313,834

DATED : February 2, 1982

INVENTOR(S) : Lawrence E. HARRIS

It is certified that error appears in the above—identified patent and that said Letters Patent is hereby corrected as shown below:

At Column 8, in line 41, delete [18.500] and insert --18,500--.

Signed and Sealed this

Seventeenth Day of August 1982

[SEAL]

Attest:

GERALD J. MOSSINGHOFF

Attesting Officer     Commissioner of Patents and Trademarks